US012491647B2

(12) United States Patent
Suto et al.

(10) Patent No.: US 12,491,647 B2
(45) Date of Patent: Dec. 9, 2025

(54) CUTTING DEVICE

(71) Applicant: Max Co., Ltd., Tokyo (JP)

(72) Inventors: Kohei Suto, Tokyo (JP); Takashi Morimura, Tokyo (JP); Kazunobu Yoshimura, Tokyo (JP); Shoma Sano, Tokyo (JP)

(73) Assignee: Max Co., Ltd., Tokyo (JP)

( * ) Notice: Subject to any disclaimer, the term of this patent is extended or adjusted under 35 U.S.C. 154(b) by 87 days.

(21) Appl. No.: 18/397,661

(22) Filed: Dec. 27, 2023

(65) Prior Publication Data
US 2024/0208089 A1 Jun. 27, 2024

(30) Foreign Application Priority Data

| Dec. 27, 2022 | (JP) | 2022-210196 |
| Dec. 27, 2022 | (JP) | 2022-210296 |
| Dec. 27, 2022 | (JP) | 2022-210302 |
| Dec. 27, 2022 | (JP) | 2022-210308 |
| Dec. 27, 2022 | (JP) | 2022-210362 |
| Dec. 27, 2022 | (JP) | 2022-210372 |
| Dec. 27, 2022 | (JP) | 2022-210594 |

(Continued)

(51) Int. Cl.
*B26B 15/00* (2006.01)

(52) U.S. Cl.
CPC .................. *B26B 15/00* (2013.01)

(58) Field of Classification Search
CPC ......... B26B 15/00; B26B 17/00; B26B 17/02; B26B 29/04; B26B 29/02; B26B 29/023;
(Continued)

(56) References Cited

U.S. PATENT DOCUMENTS

| 10,799,962 B2 | 10/2020 | Barezzani et al. |
| 2013/0055575 A1 | 3/2013 | Delmas |
| (Continued) | | |

FOREIGN PATENT DOCUMENTS

| EP | 3466578 A1 | 4/2019 |
| FR | 2611549 A * | 9/1988 |
| (Continued) | | |

OTHER PUBLICATIONS

Jun. 5, 2024—(EP) Partial EP Search Report—EP 23220292.9.
Jul. 2, 2025—(EP) Extended Search Report—App 25164103.1.

*Primary Examiner* — Jennifer S Matthews
(74) *Attorney, Agent, or Firm* — Banner & Witcoff, Ltd.

(57) ABSTRACT

An electric cutting device includes: a pair of cutting blades for clamping and cutting an object; an electric motor; and a drive mechanism for operating the cutting blades. The drive mechanism includes a movement member movable in a predetermined direction by a driving force of the electric motor and converts movement of the movement member into an opening and closing operation of the cutting blades. The drive mechanism is configured to: when the movement member moves in the predetermined direction, cause the pair of cutting blades to move in a direction closer to each other; and after the pair of cutting blades come closest to each other, when the movement member further moves in the predetermined direction, cause the pair of cutting blades to move in a direction away from each other.

7 Claims, 14 Drawing Sheets

(30) Foreign Application Priority Data

Dec. 27, 2022 (JP) .................................. 2022-210638
Aug. 31, 2023 (JP) .................................. 2023-141751

(58) Field of Classification Search
CPC ........ B23D 29/026; A01G 3/02; A01G 3/033; A01G 3/037
See application file for complete search history.

(56) References Cited

U.S. PATENT DOCUMENTS

| | | |
|---|---|---|
| 2021/0339410 A1 | 11/2021 | Hayashi et al. |
| 2022/0312680 A1 | 10/2022 | Nii |
| 2022/0314346 A1 | 10/2022 | Shen |

FOREIGN PATENT DOCUMENTS

| | | | |
|---|---|---|---|
| JP | 2004122311 A | * | 4/2004 |
| JP | 2021-171580 A | | 11/2021 |

* cited by examiner

CUTTING DEVICE

CROSS-REFERENCE TO RELATED APPLICATIONS

The present application claims priority from Japanese Patent Application No. 2022-210196 filed on Dec. 27, 2022, Japanese Patent Application No. 2022-210296 filed on Dec. 27, 2022, Japanese Patent Application No. 2022-210302 filed on Dec. 27, 2022, Japanese Patent Application No. 2022-210308 filed on Dec. 27, 2022, Japanese Patent Application No. 2022-210362 filed on Dec. 27, 2022, Japanese Patent Application No. 2022-210372 filed on Dec. 27, 2022, Japanese Patent Application No. 2022-210594 filed on Dec. 27, 2022, Japanese Patent Application No. 2022-210638 filed on Dec. 27, 2022, and Japanese Patent Application No. 2023-141751 filed on Aug. 31, 2023, the entire contents of which are incorporated herein by reference.

TECHNICAL FIELD

The present disclosure relates to an electric cutting device.

BACKGROUND ART

As an electric cutting device, an electric pruning shear as described in JP2021-171580A is known, for example. In an electric cutting device, cutting blades are operated by a driving force of an electric motor instead of a gripping force of a user, and cut an object to be cut by clamping the object with the pair of cutting blades.

SUMMARY

In an electric cutting device, a stopping position of a cutting blade after cutting is completed becomes a problem. For example, instead of a cutting device such as a pruning shear in which a pair of cutting blades operate while passing each other, in a cutting device in which a pair of cutting blades operate in opposition to each other (that is, the pair of cutting blades operate on trajectories that pass through substantially the same plane), if a timing to start braking the cutting blades is delayed, the respective cutting blades collide with each other at a high relative speed, and a situation may occur in which a part of the cutting blades is deformed or damaged.

However, a timing to start braking is not always constant, as a speed of the cutting blades varies depending on a shape and a material of an object to be cut. Thus, it is difficult to always start braking at an optimal timing to reliably prevent collisions between the cutting blades. It is also conceivable that the cutting blades are stopped with a sufficient timing before the cutting blades collide with each other. However, in such a case, there is a possibility that the cutting blades will stop before the cutting of the object to be cut is completed.

Illustrative aspects of the present disclosure provide a cutting device that can prevent collisions between cutting blades while reliably cutting an object to be cut.

An electric cutting device according to one illustrative aspect of the present disclosure includes: a pair of cutting blades configured to clamp and cut an object; an electric motor configured to generate a driving force; and a drive mechanism configured to cause the cutting blades to operate by the driving force of the electric motor. The drive mechanism includes a movement member configured to move in a predetermined direction by the driving force of the electric motor, the drive mechanism being configured to convert movement of the movement member into an opening and closing operation of the cutting blades. The drive mechanism is configured to: in a case where the movement member moves in the predetermined direction, cause the pair of cutting blades to move in a direction closer to each other; and after the pair of cutting blades come closest to each other, in a case where the movement member further moves in the predetermined direction, cause the pair of cutting blades to move in a direction away from each other.

In the cutting device configured as described above, when the movement member continues to move in the predetermined direction, the pair of cutting blades move toward each other, come closest to each other, and then move away from each other. The drive mechanism for executing such an operation can be easily implemented by a toggle link mechanism including, for example, a nut of a ball screw.

In such a configuration, a position of the pair of cutting blades when the cutting blades come closest to each other is determined mechanically, regardless of a timing when the movement member stops. Therefore, if the movement member moves to a position exceeding the position where the pair of cutting blades come closest to each other, and then stops, the pair of cutting blades can be reliably brought closest to each other, thereby cutting the object. In that case, even if highly accurate positioning control such as stopping the movement member at a precise position is not performed, a positional relationship between the cutting blades when the cutting blades come closest to each other is always constant. Therefore, collisions between the cutting blades can be reliably prevented.

The state where the pair of cutting blades come closest to each other may be a state where a predetermined gap is open between the cutting blades, or a state where the gap becomes zero. Even when the cutting blades come closest to each other until the gap becomes zero, it is possible to prevent that the cutting blades collide with each other and cause damage.

According to the present disclosure, a cutting device is provided that can effectively prevent collisions between cutting blades while ensuring reliable cutting of an object to be cut.

DESCRIPTION OF EMBODIMENTS

Figure 1:
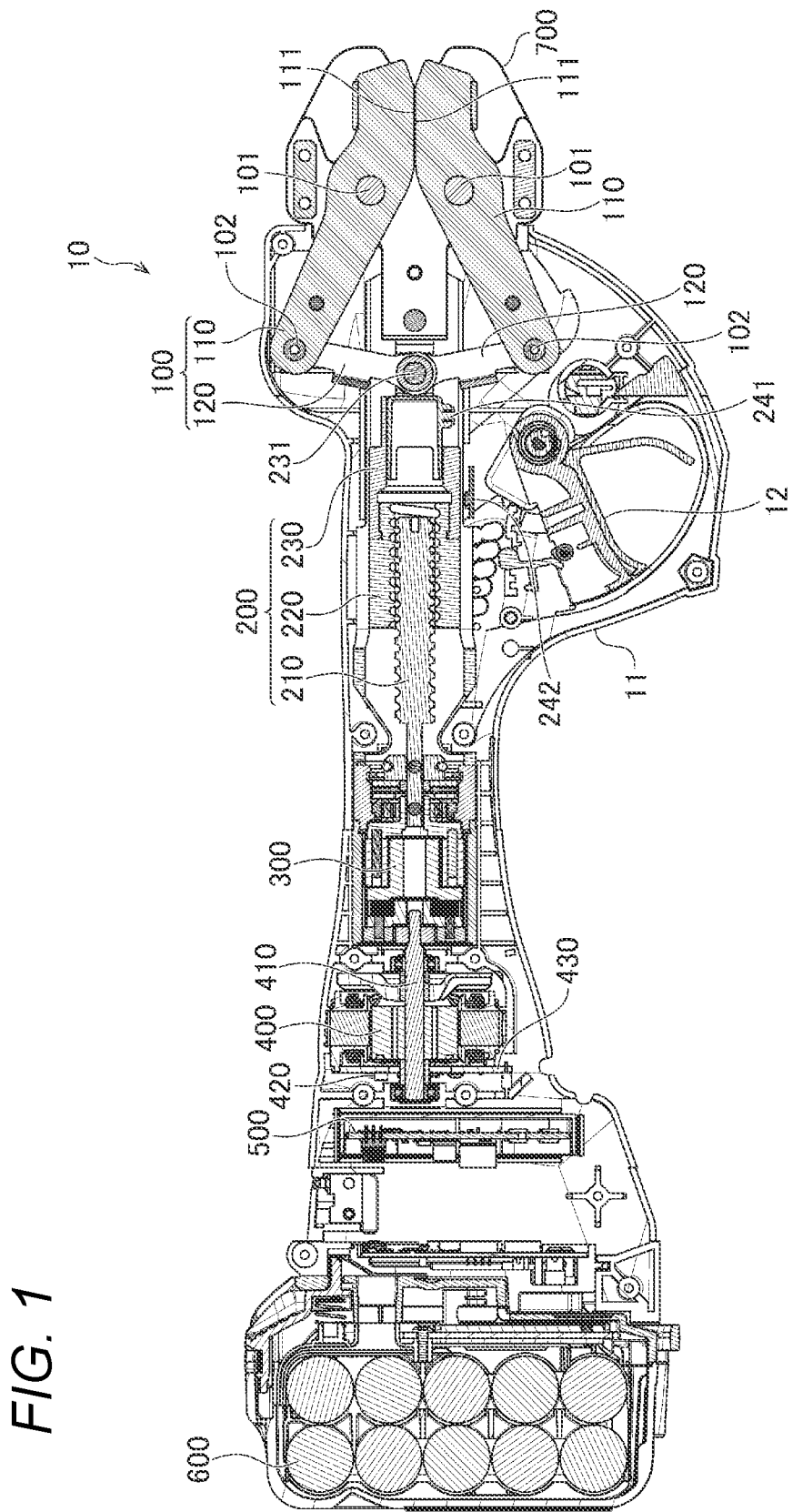
FIG. 1 is a diagram showing a configuration of a cutting device according to a first illustrative embodiment.

The present illustrative embodiment will be described below with reference to the accompanying drawings. In order to facilitate understanding of the description, the same components are denoted by the same reference numerals as much as possible in the drawings, and redundant descriptions will be omitted.

A first illustrative embodiment will be described. A cutting device 10 according to the present illustrative embodiment is an electric cutting device. The cutting device 10 is configured as a device for cutting a reinforcing bar at a construction site or the like. A configuration of the cutting device 10 will be described mainly with reference to FIG. 1. The cutting device 10 includes a housing 11, a trigger switch 12, a cutting mechanism 100, a ball screw 200, a speed reducer 300, an electric motor 400, a control board 500, and a storage battery 600.

The housing 11 is a container that defines an outer shape of the cutting device 10. The housing 11 is made of resin, for example. The ball screw 200 described later, the speed reducer 300 described later, and the like are housed inside the housing 11. In FIG. 1, a portion of the housing 11 on a front side when viewed on paper is removed, and an internal configuration of the cutting device 10 is shown as a cross-sectional view.

The trigger switch 12 is a switch operated by a finger of a user. The user can turn on the trigger switch 12 by placing his or her finger on the trigger switch 12 and pulling the trigger switch 12 to the front side. When the user loosens his or her finger, the trigger switch 12 returns to an original position due to a force of a spring, and enters into the OFF state. When the trigger switch 12 is switched between an ON state and the OFF state, a corresponding signal is transmitted to the control board 500 described later. The trigger switch 12 corresponds to an "operation unit" that can be switched between the ON state and the OFF state by an operation performed by the user. As will be described later, if the user performs an operation of switching the trigger switch 12 into the ON state, cutting of the reinforcing bar is started.

The cutting mechanism 100 is a portion configured to cut the reinforcing bar which is an object to be cut. The cutting mechanism 100 includes a pair of blade members 110 and a pair of link members 120.

The cutting blades 111 that clamp and cut the object to be cut are formed on the respective blade members 110. The blade member 110 is held pivotably about a shaft 101 fixed to the housing 11. In the present illustrative embodiment, the respective blade members 110 are arranged to face each other such that ridge lines of blade edges of the cutting blades 111 operate on trajectories passing through substantially the same plane. Accordingly, it is possible to switch between an opened state where the respective cutting blades 111 are spaced apart from each other and a closed state where the respective cutting blades 111 come into contact with (or close to) each other. In the example of FIG. 1, the pair of cutting blades 111 are in the closed state.

Each link member 120 is a rod-shaped member, and one end of the link member 120 is connected to the blade member 110 via a shaft 102, and the other end of the link member 120 is connected to a connection member 230 described later via a shaft 231. The link member 120 and the blade member 110 are connected to each other in a manner of pivoting about the shaft 102. The shaft 102, which is a connection point of the link member 120 and the blade member 110, is located across a rotation shaft 101 of the blade member 110 from the cutting blade 111. Similarly, the link member 120 and the connection member 230 are connected to each other in a manner of pivoting about the shaft 231. As will be described later, the connection member 230 moves in a left-right direction in FIG. 1 by a driving force of the electric motor 400. The link mechanism 120 in this illustrative embodiment is configured by a sheet metal component with a C-shaped cross-sectional shape. The link mechanism is configured by two parallel plate-shaped members and one plate-shaped member that connects the two plate-shaped members.

If the connection member 230 moves in a left direction from the state shown in FIG. 1, the blade member 110 on the upper side in FIG. 1 pivots counterclockwise, and the blade member 110 on the lower side in FIG. 1 pivots clockwise. Accordingly, the pair of cutting blades 111 change from the closed state to the opened state. On the other hand, when the pair of cutting blades 111 are in the opened state, if the connection member 230 moves in the right direction in FIG. 1, the blade member 110 on the upper side in FIG. 1 pivots clockwise, and the blade member 110 on the lower side in FIG. 1 pivots counterclockwise. Accordingly, the pair of cutting blades 111 return to the closed state. Accordingly, the pair of blade members 110, the pair of link members 120, and the connection member 230 as a whole constitute a so-called "toggle link mechanism".

Figure 2:
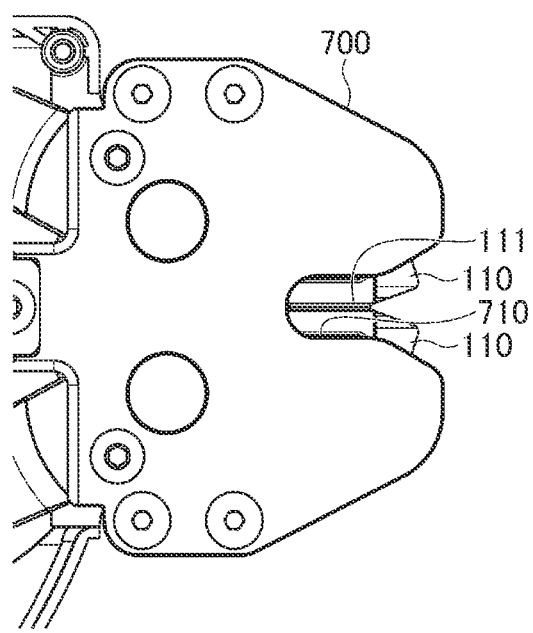
FIG. 2 is a diagram showing a configuration of guide plates included in the cutting device according to the first illustrative embodiment.

In the present illustrative embodiment, a pair of guide plates 700 are provided near the blade members 110. The guide plates 700 are plate-shaped members made of metal. The guide plates 700 are disposed to sandwich the blade members 110 from both the front side and the back side in FIG. 1 when viewed on paper. Shapes of the pair of guide plates 700 are the same. As shown in FIG. 2, each guide plate 700 has a recess 710 formed therein.

For convenience of description, a right side in FIG. 1 will also be referred to as a "front end side" below, and a left side in FIG. 1 will be referred to as a "rear end side" below. The recess 710 is formed to recede from the front end side toward the rear end side of the guide plate 700. When the cutting device 10 is viewed from a side as shown in FIGS. 1 and 2, each recess 710 is formed at a position that includes the cutting blade 111 in the closed state. In the standby state where the cutting blades 111 are fully opened, the cutting blades 111 are retracted to the outside of the recesses 710, and from a perspective of FIG. 2, the entire blade members 110 are hidden by the guide plates 700. The guide plates 700 have both a function of covering and protecting the cutting blades 111 in the standby state, and a function of guiding the reinforcing bar, which is the object to be cut, along the recesses 710 between the pair of cutting blades 111. The guide plates 700 further have a function of stabilizing a posture of the cutting device 10 before and after cutting to be stable by sandwiching the reinforcing bar in the recesses 710.

The ball screw 200 is a device for converting a rotational movement of the electric motor 400 into a linear movement of the connection member 230, thereby causing the cutting mechanism 100 to operate. The ball screw 200 includes a screw shaft 210, a nut 220, and the connection member 230.

The screw shaft 210 is a rod-shaped member that extends linearly from the rear end side to the front end side. A male screw is formed on an outer peripheral surface of the screw shaft 210. When the electric motor 400 is driven, the screw shaft 210 rotates about a central axis thereof.

The nut 220 is a substantially cylindrical member disposed to surround the screw shaft 210 from an outer peripheral side. A female screw is formed on an inner peripheral surface of the nut 220, and is screwed to the male screw formed on the outer peripheral surface of the screw shaft 210. While the nut 220 is allowed to move along a longitudinal direction of the screw shaft 210, rotation about the central axis of the screw shaft 210 is restricted. Therefore, when the screw shaft 210 rotates about the central axis thereof, the nut 220 moves in the left-right direction in FIG. 1 along the central axis.

The connection member 230 is a member attached to the nut 220 and is a member that moves along the screw shaft 210 together with the nut 220. The connection member 230 is attached in a manner of protruding from the nut 220 toward the front end side. The pair of link members 120 are connected to a portion of the connection member 230 near an end on the front end side via the shaft 231 described above.

A magnet 241 is attached to the outer peripheral surface of the connection member 230. A Hall sensor 242 is attached to the housing 11 at a position near the connection member 230. The position where the Hall sensor 242 is attached is such that when the nut 220 moves to a rear end from the state shown in FIG. 1 and the cutting blades 111 are fully opened, the Hall sensor 242 faces the magnet 241 of the connection member 230. When the cutting blades 111 are fully opened, a signal is transmitted from the Hall sensor 242 by facing the magnet 241, and the signal is input to the control board 500.

The speed reducer 300 is a device that is configured to reduce a rotation speed of an output shaft 410 of the electric motor 400 and then transmit the rotation to the screw shaft 210 of the ball screw 200.

The electric motor 400 is a rotating electrical machine for generating a driving force necessary for operating the cutting blades 111, and is, for example, a brushless DC motor.

The electric motor 400 has the output shaft 410. The output shaft 410 is a substantially cylindrical member, and a central axis thereof coincides with the central axis of the screw shaft 210. A part of the output shaft 410 protrudes toward the speed reducer 300 and is connected to the speed reducer 300.

When current is supplied to a coil of the electric motor 400, the output shaft 410 rotates about the central axis thereof. The rotation of the output shaft 410 is transmitted to the screw shaft 210 via the speed reducer 300, and causes the nut 220 to move toward the front end side or the rear end side. Accordingly, the cutting blades 111 of the cutting mechanism 100 are operated to open and close as described above.

A rotation sensor 420 is provided inside the electric motor 400. The rotation sensor 420 is a sensor that is configured to emit a pulse signal every time the output shaft 410 rotates by a predetermined angle, and is provided on a board 430 included in the electric motor 400. The pulse signal from the rotation sensor 420 is transmitted to the control board 500. By counting the number of pulse signals, the control board 500 is able to know a rotation angle of the output shaft 410 after a specific timing. The control board 500 is also able to know the rotation speed of the output shaft 410 based on the number of pulse signals input per unit time. The rotation sensor 420 may be a different type of a sensor from that of the present illustrative embodiment, or may be a sensor separately provided at a position different from the electric motor 400 as long as the sensor can measure the rotation angle and the rotation speed of the output shaft 410.

The control board 500 is a circuit board provided to control an overall operation of the cutting device 10 including the electric motor 400. The control board 500 includes an inverter circuit for adjusting current supplied to the electric motor 400, a microcomputer for controlling a switching operation and the like in the inverter circuit, and the like.

The storage battery 600 stores electric power necessary for operating the electric motor 400 and the control board 500, and is, for example, a lithium ion battery. In the cutting device 10, a portion in which the storage battery 600 is built is detachable from the housing 11 as a battery pack, and is connected to and charged by an external charger. Instead of such an aspect, a configuration may be adopted in which the storage battery 600 can be charged while the storage battery 600 is attached to the housing 11.

A mechanism for operating the cutting blades 111 will be described in more detail. As described above, in the cutting device 10, the nut 220 and the connection member 230 of the ball screw 200 move linearly in a direction parallel to the central axis of the screw shaft 210 by the driving force of the electric motor 400. Such an operation of the connection member 230 is converted into an opening and closing operation of the cutting blades 111 provided on the blade members 110 via the link members 120. The nut 220, the connection member 230, the link member 120, and the blade member 110 constitute a "drive mechanism" that causes the cutting blades 111 to operate by the driving force of the electric motor 400. The nut 220 and the connection member 230, which are part of the drive mechanism, correspond to a "movement member" that moves in a predetermined direction by the driving force of the electric motor 400.

Figure 3A:
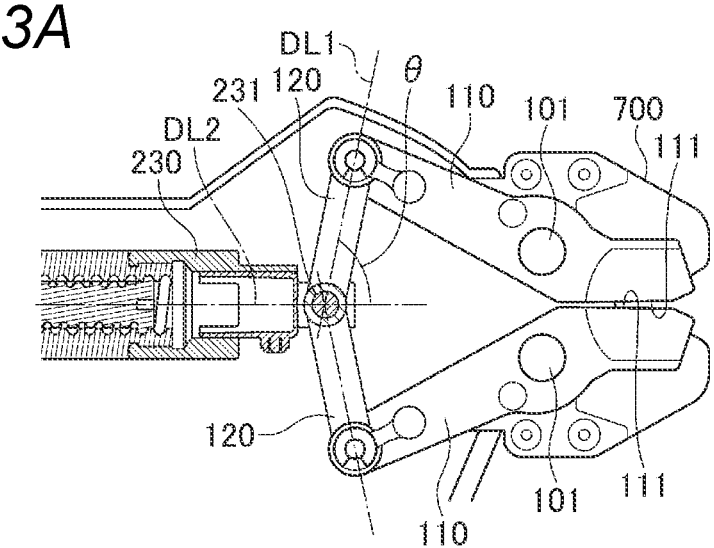
FIG. 3A, FIG. 3B, and FIG. 3C are diagrams illustrating a drive mechanism of the cutting device according to the first illustrative embodiment.
Figure 3B:
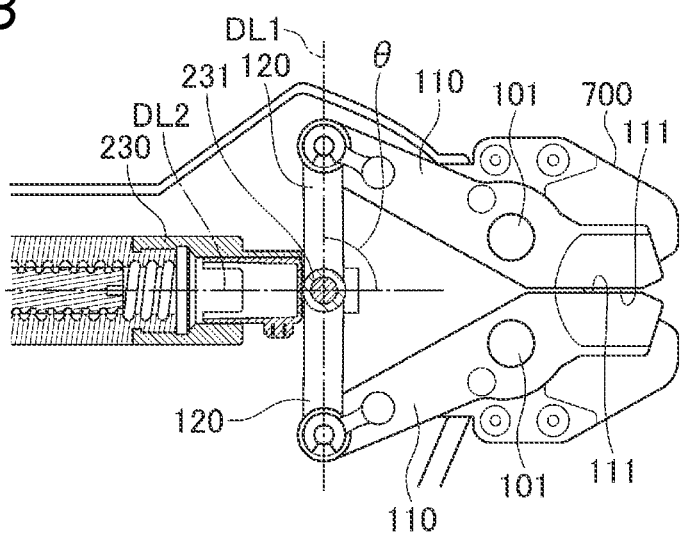
Figure 3C:
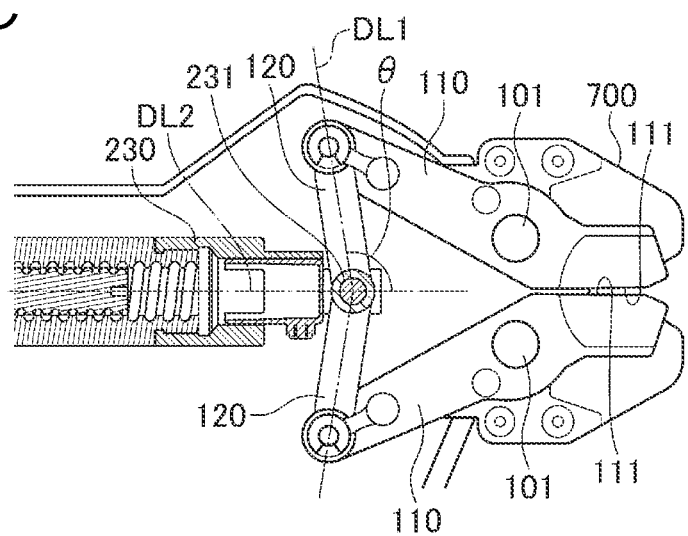

FIG. 3A, FIG. 3B, and FIG. 3C show how the cutting blades 111 close as a position of the connection member 230, which is the movement member, changes. After the cutting blades 111 start moving in a closing direction, the connection member 230 continues to move toward the front end side. FIG. 3A shows a state where the cutting blades 111 are in processing of closing. In this case, the pair of cutting blades 111 are moving closer to each other, but do not come closest to each other.

A dotted line DL1 is a line representing a longitudinal direction of the link member 120. The "longitudinal direction" of the link member 120 is, for example, a direction from the center of the shaft 102 to the center of the shaft 231 in FIG. 1. A dotted line DL2 is a line representing a direction in which the connection member 230 is moving, that is, the direction of the central axis of the screw shaft 210. An angle formed between the dotted line DL1 and the dotted line DL2 will also be referred to as an "angle θ" below. From the time when the cutting blades 111 start to move in the closing direction until the state shown in FIG. 3A is reached, the angle θ gradually increases as the connection member 230 moves. At the time point of FIG. 3A, the angle θ is smaller than 90 degrees.

FIG. 3B shows a state where the connection member 230 is further moved toward the front end side from the state in FIG. 3A. At a time point of FIG. 3B, the angle θ is 90 degrees, and the pair of cutting blades 111 come closest to each other. The present illustrative embodiment is configured such that a slight gap is formed between the cutting blades 111 even in the state where the cutting blades 111 come closest to each other. In order to reliably cut the reinforcing bar, it is preferable that a size of the gap at the time of closest approach is 10% or less of a diameter of the reinforcing bar. Incidentally, as shown in FIG. 3B, in the state where the pair of cutting blades 111 come closest to each other, the pair of link members 120 align in a substantially straight line as viewed from an axial direction of the shaft 231 of the connection member 230.

Instead of such an aspect, as shown in FIG. 3B, the angle θ becomes 90 degrees, and at the same time, the cutting blades 111 may be in contact with each other.

In the present illustrative embodiment, even when the pair of cutting blades 111 come closest to each other as shown in FIG. 3B, the connection member 230 does not stop and continues to move toward the front end side. FIG. 3C shows a state where the connection member 230 is further moved toward the front end side from the state in FIG. 3A. When the connection member 230 reaches a position shown in FIG. 3C, the electric motor 400 stops operating, and the connection member 230 and the cutting blades 111 also stop. At a time point in FIG. 3C, the angle θ is larger than 90 degrees. Further, in the state of FIG. 3C where the connection member 230 is further moved toward the front end side from the state in FIG. 3B, a distance between the connection points of the link members 120 and the blade members 110 becomes shorter than that in the state of FIG. 3B. Therefore, the cutting blades 111 slightly move in a direction away from each other from the state shown in FIG. 3B.

In this way, the drive mechanism according to the present illustrative embodiment is configured such that if the connection member 230, which is the movement member, moves in a predetermined direction, the pair of cutting blades 111 move in a direction closer to each other, and after the pair of cutting blades 111 come closest to each other, if the connection member 230 further moves in the above predetermined direction, the pair of cutting blades 111 move away from each other. The above "predetermined direction" is the direction parallel to the central axis of the screw shaft 210, and is a direction from the rear end side to the front end side. In such a configuration, the position of the pair of cutting blades 111 when the cutting blades 111 come closest to each other (FIG. 3B) is determined mechanically, regardless of a timing when the connection member 230 stops.

Figure 4:
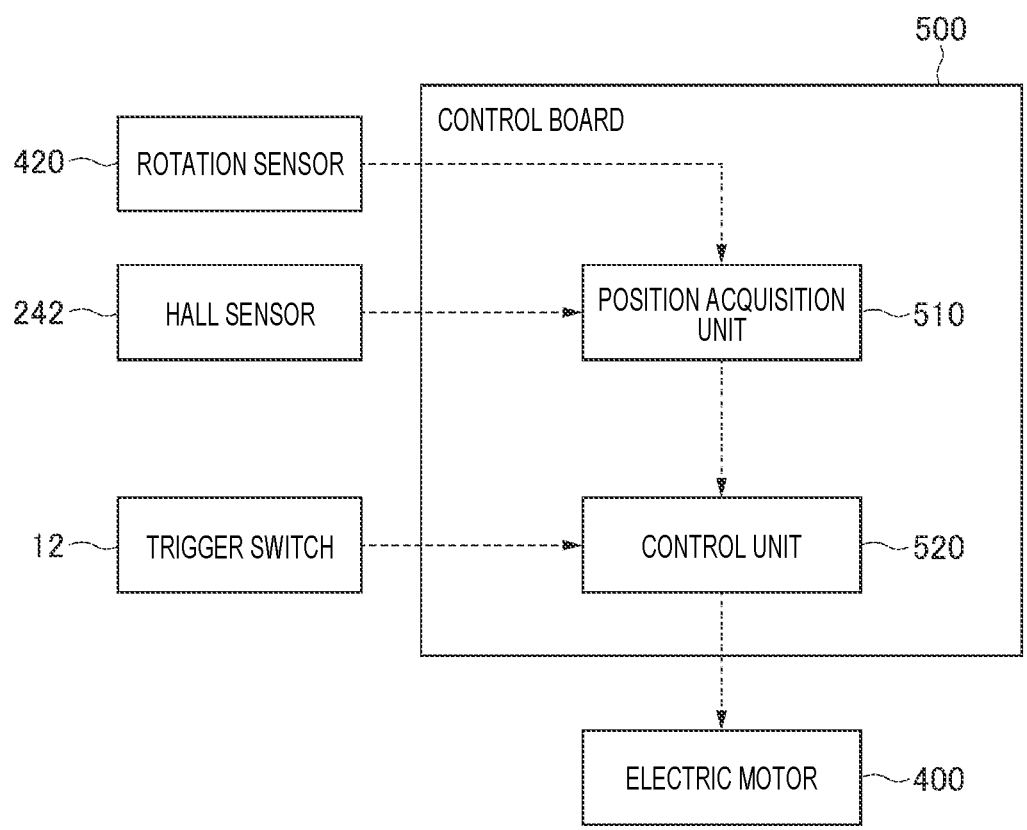
FIG. 4 is a diagram showing a configuration of a control board included in the cutting device according to the first illustrative embodiment.

A configuration of the control board 500 will be described with reference to FIG. 4. The control board 500 including the microcomputer includes a position acquisition unit 510 and a control unit 520 as elements representing functions of the control board 500.

The position acquisition unit 510 is configured to perform processing of acquiring a current position of the connection member 230. In the present illustrative embodiment, a count value of the pulse signal input from the rotation sensor 420 is calculated and acquired by the position acquisition unit 510 as the "current position" of the connection member 230, based on a time when the magnet 241 and the Hall sensor 242 face each other. The "current position" acquired by the position acquisition unit 510 may be any index that directly or indirectly indicates the current position of the connection member 230, and may be a value other than the count value of the pulse signal. For example, a value representing a distance advanced by the connection member 230 from the above reference position in units such as millimeters may be used as the above "current position".

In order to enable acquisition of the current position of the connection member 230, a reset operation may be performed when the cutting device 10 is started up. In the reset operation, for example, the electric motor 400 may be driven in a direction where the pair of cutting blades 111 change from the closed state to the opened state, and the electric motor 400 may be stopped at a time point when a detection signal from the Hall sensor 242 is input. By starting counting the pulse signals from this time point, the current position of the connection member 230 can be accurately acquired from then on.

The control unit 520 is configured to control the operation of the electric motor 400. The control unit 520 controls an opening and closing operation of the cutting blades 111 by adjusting magnitude of current supplied to the electric motor 400, for example, by PWM control. The control unit 520 also controls a braking operation of the cutting blades 111 by performing a so-called "short braking" that short-circuits some of a plurality of coils included in the electric motor 400 periodically or continuously.

Figure 5:
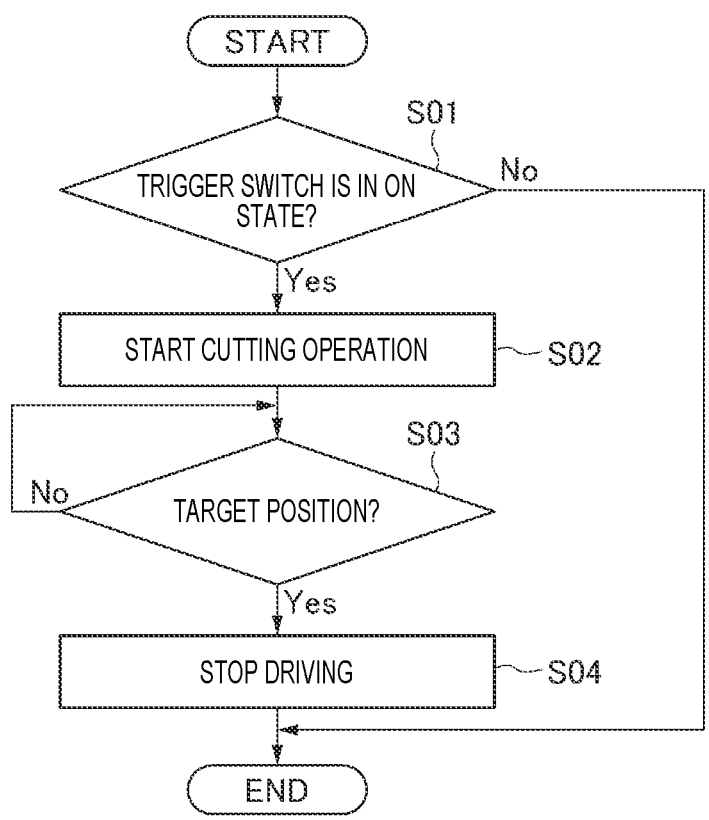
FIG. 5 is a flowchart showing a flow of processing executed by the control board according to the first illustrative embodiment.

Processing executed by the control board 500 will be described with reference to FIG. 5. A series of processing shown in a flowchart of FIG. 5 is repeatedly executed by the control board 500 every time a predetermined control period elapses after the above reset operation is completed.

In a first step S01 of the processing, it is determined by the control board 500, for example, whether the trigger switch 12 is in the ON state. If the trigger switch 12 is kept in the OFF state, the processing in FIG. 5 is temporarily ended. If the trigger switch 12 is kept in the ON state, the processing proceeds to step S02.

In step S02, the control unit 520 performs processing of driving the electric motor 400 to start operating the cutting blades 111 in the closing direction. Accordingly, cutting of the reinforcing bar is started. In and after step S02, the connection member 230 moves toward the front end side.

In step S03 following step S02, it is determined by the control board 500, for example, whether the connection member 230 reaches a target position. The "target position" is, for example, the position of the connection member 230 in the state shown in FIG. 3B or FIG. 3C. The determination in step S03 can be made, for example, based on whether the count value of the pulse signal from the rotation sensor 420 reaches a value corresponding to the target position.

If the connection member 230 does not reach the target position, the processing in step S03 is executed again while continuing the movement of the connection member 230 toward the front end side. If the connection member 230 reaches the target position, the processing proceeds to step S04.

In step S04, processing of stopping the operations of the connection member 230 and the cutting blades 111 is performed. Specifically, processing such as a short braking for braking the electric motor 400 is started. In step S04, the connection member 230 and the cutting blades 111 may be stopped by simply stopping current supplied to the electric motor 400. Following the processing of stopping the operation of the cutting blades 111, the processing of returning the cutting blades 111 to a fully opened position may be automatically performed.

As described above, when cutting the reinforcing bar, the control unit 520 is configured such that the connection member 230 moves in the above "predetermined direction" until the pair of cutting blades 111 move in a direction toward each other, and after coming closest to each other, start to move in a direction away from each other.

According to such control, the pair of cutting blades 111 can be reliably brought closest to each other, thereby cutting the reinforcing bar. In that case, even if highly accurate positioning control such as stopping the connection member 230 at a precise position is not performed, a positional relationship between the cutting blades 111 when the cutting blades 111 come closest to each other as in FIG. 3B is always constant. Therefore, collisions between the cutting blades 111 can be reliably prevented.

A second illustrative embodiment will be described. In the following, points different from the first illustrative embodiment will be mainly described, and descriptions of points common to those of the first illustrative embodiment will be omitted as appropriate. The present illustrative embodiment differs from the first illustrative embodiment in the configuration of the blade members 110. The configuration of the blade members 110 in the present illustrative embodiment will be described with reference to FIG. 6.

Figure 6:
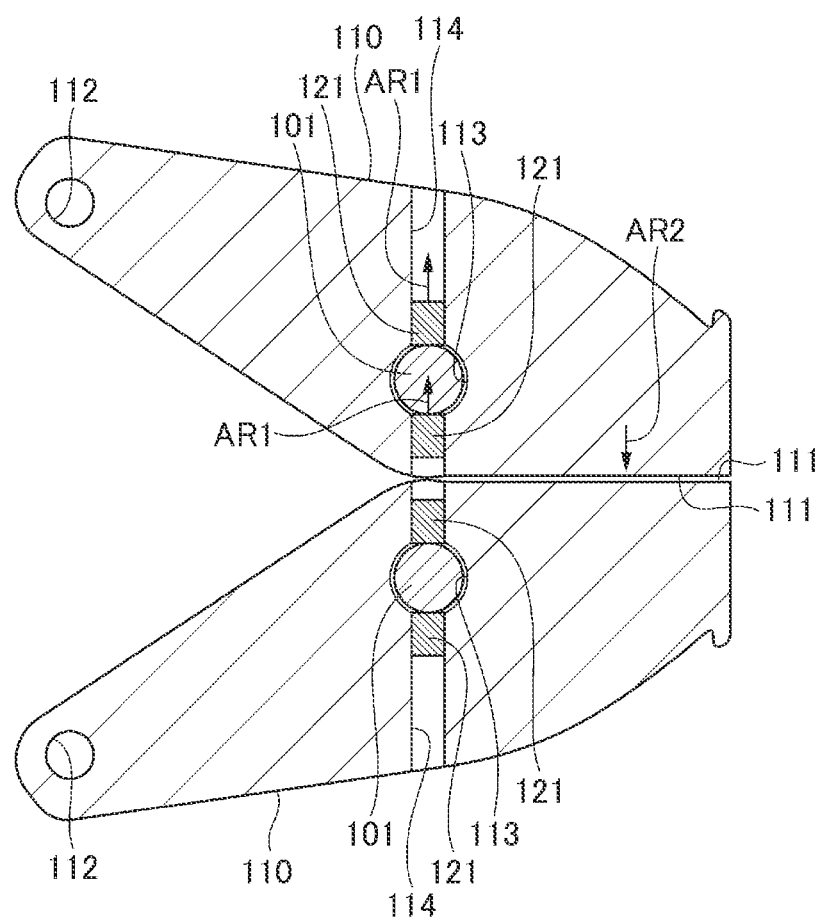
FIG. 6 is a diagram showing a configuration of an adjustment mechanism of a cutting device according to a second illustrative embodiment.

A through hole 112 shown in FIG. 6 is a hole through which the shaft 102 is inserted. A through hole 113 is a hole through which the shaft 101, which is a rotation shaft of the blade member 110, is inserted. In the present illustrative embodiment, an inner diameter of the through hole 113 is slightly larger than an outer diameter of the shaft 101.

The blade member 110 further has a through hole 114 formed therein. The through hole 114 is formed to penetrate the blade member 110 in a direction perpendicular to the through hole 113. A central axis of the through hole 114 intersects with a central axis of the through hole 113. Therefore, the through holes 114 are opened at two locations on inner surfaces of the through holes 113. A female screw (not shown) is formed on an inner surface of the through hole 114.

Two adjustment screws 121 are arranged inside the through hole 114. The adjustment screw 121 is also referred to as a "hexagonal hole set screw" or "potted screw", and is a member having a male screw (not shown) formed on an outer peripheral surface thereof. The two adjustment screws 121 protrude from the inner surface of the through hole 113 toward the shaft 101, and sandwich the shaft 101 between the adjustment screws 121.

A protrusion amount of the adjustment screw 121 from the inner surface of the through hole 113 can be adjusted by rotating the adjustment screw 121 by a manufacturer or user of the cutting device 10. For example, if the two adjustment screws 121 of the blade member 110 on the upper side in FIG. 6 are adjusted to move in a direction of an arrow AR1, the entire blade member 110 including the cutting blade 111 moves in a direction of an arrow AR2 with respect to the shaft 101. Similarly, if the two adjustment screws 121 are adjusted to move in a direction opposite to the arrow AR1, the entire blade member 110 including the cutting blade 111 moves in a direction opposite to the arrow AR2 with respect to the shaft 101. The same applies to the blade member 110 on the lower side in FIG. 6.

In the present illustrative embodiment, by adjusting the position of the blade member 110 as described above, it is possible to adjust a gap between the cutting blades 111 when the cutting blades 111 come closest to each other. The through hole 114 and the adjustment screws 121 correspond to an "adjustment mechanism" for adjusting the gap between the pair of cutting blades 111.

The adjustment mechanism may be provided on each of the blade members 110 as in the present illustrative embodiment, or may be provided on only one blade member 110.

A third illustrative embodiment will be described. In the following, points different from the first illustrative embodiment will be mainly described, and descriptions of points common to those of the first illustrative embodiment will be omitted as appropriate. The present illustrative embodiment also differs from the first illustrative embodiment in the configuration of the blade members 110. The configuration of the blade members 110 in the present illustrative embodiment will be described with reference to FIG. 7 and FIG. 8.

Figure 7:
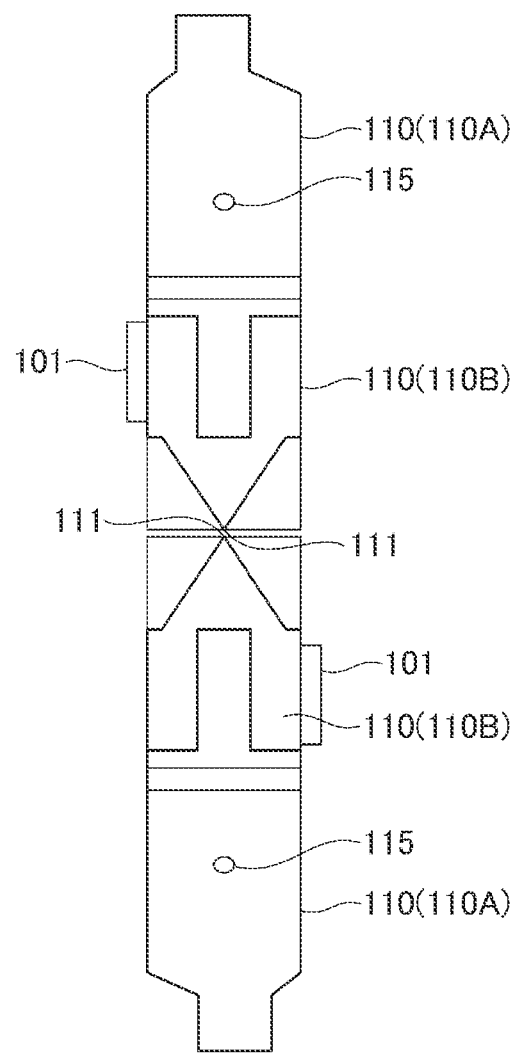
FIG. 7 is a diagram showing a configuration of a blade member of a cutting device according to a third illustrative embodiment.
Figure 8:
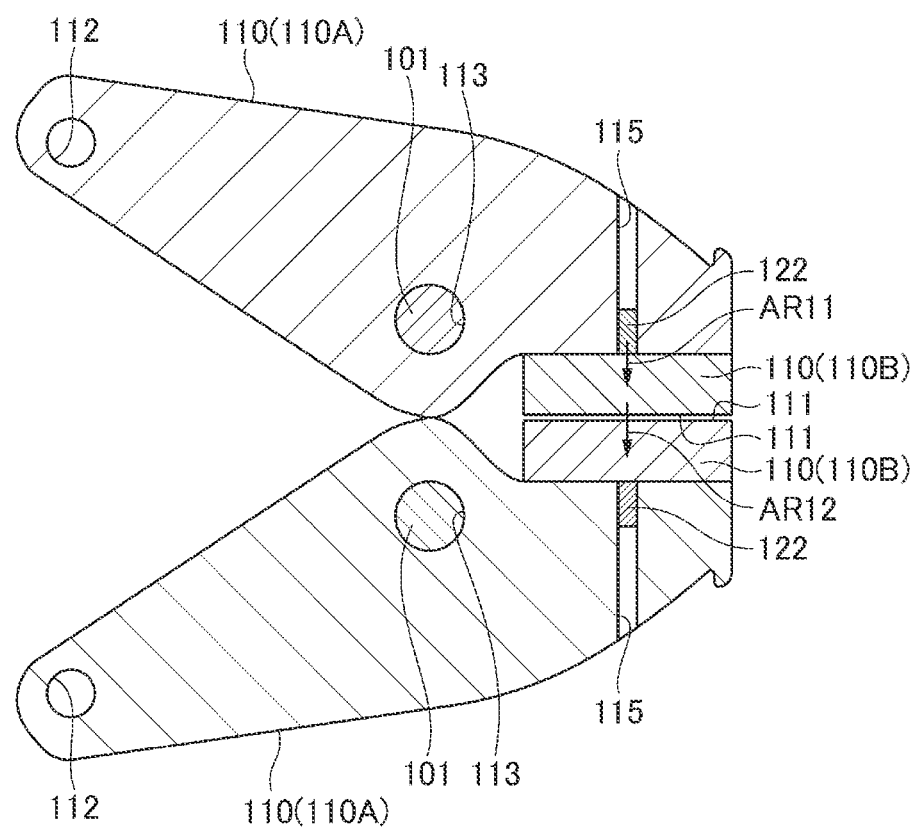
FIG. 8 is a diagram showing a configuration of an adjustment mechanism of the cutting device according to the third illustrative embodiment.

FIG. 7 is a diagram of the pair of blade members 110 in a closed state, viewed from the front end side along the central axis of the screw shaft 210. FIG. 8 is a diagram illustrating the blade members 110 from the same perspective as FIG. 6. As shown in FIG. 7 and FIG. 8, in the present illustrative embodiment, each of the blade members 110 is divided into two members, a first member 110A and a second member 110B.

The first members 110A are members that occupy most of the blade members 110. The through hole 112 through which the shaft 102 is inserted and the through hole 113 through which the shaft 101 (rotation shaft) is inserted are formed in each of the first members 110A.

The second members 110B are members in which the cutting blades 111 are formed. The second members 110B are attached to the first members 110A so as to be movable in an upper-lower direction in FIG. 7. The first members 110A are members to which the second members 110B having the cutting blades 111 are attached, and correspond to a "blade base" that operates together with the cutting blades 111.

A through hole 115 is formed in the first member 110A. The through hole 115 is formed to penetrate the blade member 110 in a direction perpendicular to the through hole 113. A central axis of the through hole 115 intersects with the second member 110B. A female screw (not shown) is formed on an inner surface of the through hole 115.

An adjustment screw 122 is disposed inside the through hole 115. The adjustment screw 122 is also referred to as a "hexagonal hole set screw" or "potted screw", and is a member having a male screw (not shown) formed on an outer peripheral surface thereof. The adjustment screw 122 protrudes from the through hole 115 toward the second member 110B, and a front end of the adjustment screw 122 is in contact with the second member 110B.

A protrusion amount of the adjustment screw 122 from the through hole 115 can be adjusted by rotating the adjustment screw 122 by the manufacturer or user of the cutting device 10. For example, if the adjustment screw 122 of the blade member 110 on the upper side in FIG. 8 is adjusted to move in a direction of an arrow AR11, the entire second member 110B including the cutting blade 111 moves in a direction of an arrow AR12 with respect to the first member 110A. Similarly, if the adjustment screw 122 is adjusted to move in a direction opposite to the arrow AR11, the entire second member 110B including the cutting blade 111 moves in a direction opposite to the arrow AR12. The same applies to the blade members 110 on the lower side in FIG. 8.

In the present illustrative embodiment, as described above, by adjusting attachment positions of the cutting blades 111 of the first members 110A, it is possible to adjust the gap between the cutting blades 111 when the cutting blades 111 come closest to each other. The through hole 115 and the adjustment screw 122 correspond to the "adjustment mechanism" for adjusting the gap between the pair of cutting blades 111.

Figure 9:
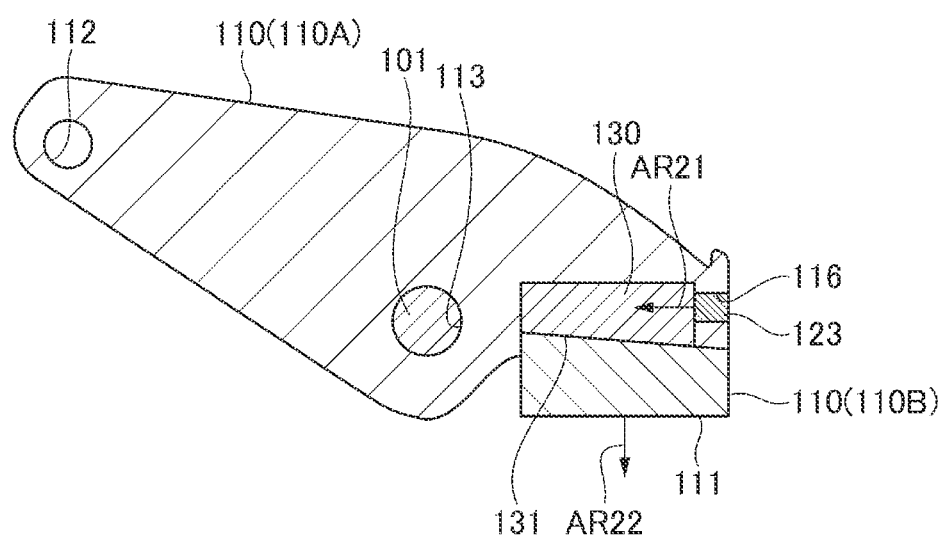
FIG. 9 is a diagram showing a configuration of an adjustment mechanism of a cutting device according to a fourth illustrative embodiment.

A fourth illustrative embodiment will be described. In the following, points different from the first illustrative embodiment will be mainly described, and descriptions of points common to those of the first illustrative embodiment will be omitted as appropriate. The present illustrative embodiment also differs from the first illustrative embodiment in the configuration of the blade members 110. The configuration of the blade members 110 in the present illustrative embodiment will be described with reference to FIG. 9.

In the present illustrative embodiment, each of the blade members 110 is divided into two members, a first member 110A and a second member 110B, similarly to the third illustrative embodiment (FIG. 8).

A through hole 116 is formed in the first member 110A. The through hole 116 is formed linearly in a direction parallel to a ridge line of the cutting blade 111 from an end portion at a front end side of the first member 110A. A space is formed on a back side of the through hole 116, and a wedge member 130 is fitted into the space. The wedge member 130 is held movably along a central axis of the through hole 116. An inclined surface 131 is formed at a portion of the wedge member 130 on a second member 110B side. The inclined surface 131 is a flat surface that is inclined in a manner of approaching a cutting blade 111 side as the inclined surface 131 goes from the rear end side to the front end side. The second member 110B is held in contact with the inclined surface 131 of the first member 110A.

A female screw (not shown) is formed on an inner surface of the through hole 116 provided in the first member 110A. An adjustment screw 123 is disposed inside the through hole 116. The adjustment screw 123 is also referred to as a "hexagonal hole set screw" or "potted screw", and is a member having a male screw (not shown) formed on an outer peripheral surface thereof. The adjustment screw 123 protrudes from the through hole 116 toward the wedge member 130, and the front end of the adjustment screw 123 is in contact with the wedge member 130.

A protrusion amount of the adjustment screw 123 from the through hole 116 can be adjusted by rotating the adjustment screw 123 by the manufacturer or user of the cutting device 10. For example, if the adjustment screw 123 is adjusted to move in a direction of an arrow AR21 in FIG. 9, as the wedge member 130 moves toward the rear end side, the entire second member 110B including the cutting blade 111 moves in a direction of an arrow AR22 with respect to the first member 110A. Similarly, if the adjustment screw 123 is adjusted to move in a direction opposite to the arrow AR21, the entire second member 110B including the cutting blade 111 moves in a direction opposite to the arrow AR22.

In the present illustrative embodiment, similar to the third illustrative embodiment (FIG. 8), by adjusting an attachment position of the cutting blade 111 of the first member 110A, it is possible to adjust the gap between the cutting blades 111 when the cutting blades 111 come closest to each other. The through hole 116, the adjustment screw 123, and the wedge member 130 correspond to the "adjustment mechanism" for adjusting the gap between the pair of cutting blades 111.

A fifth illustrative embodiment will be described. In the following, points different from the first illustrative embodiment will be mainly described, and descriptions of points common to those of the first illustrative embodiment will be omitted as appropriate. The present illustrative embodiment differs from the first illustrative embodiment in the configuration of the blade member 110 and the configuration of the shaft 101 that is the rotation shaft of the blade member 110.

Figure 10:
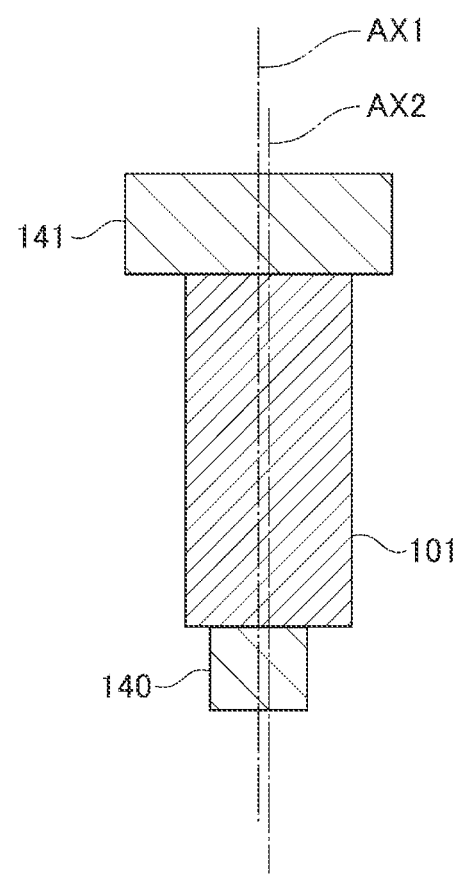
FIG. 10 is a diagram showing a configuration of an adjustment mechanism of a cutting device according to a fifth illustrative embodiment.

FIG. 10 shows a configuration of the shaft 101 in the present illustrative embodiment. The shaft 101 of the present illustrative embodiment is provided with an internal shaft 140. The internal shaft 140 is a cylindrical member and extends through the shaft 101. A portion of the internal shaft 140 on the lower side in FIG. 10 protrudes further downward from the shaft 101 and is rotatably attached to the housing 11 or the guide plate 700. A portion of the internal shaft 140 on the upper side in FIG. 10 projects further upward from the shaft 101. This portion is an enlarged diameter portion 141 having a larger diameter than other portions.

AX1 shown in FIG. 10 is a central axis of the internal shaft 140, and AX2 is a central axis of the shaft 101. These two central axes do not coincide with each other. In other words, the shaft 101 is eccentric with respect to the internal shaft 140.

Figure 11:
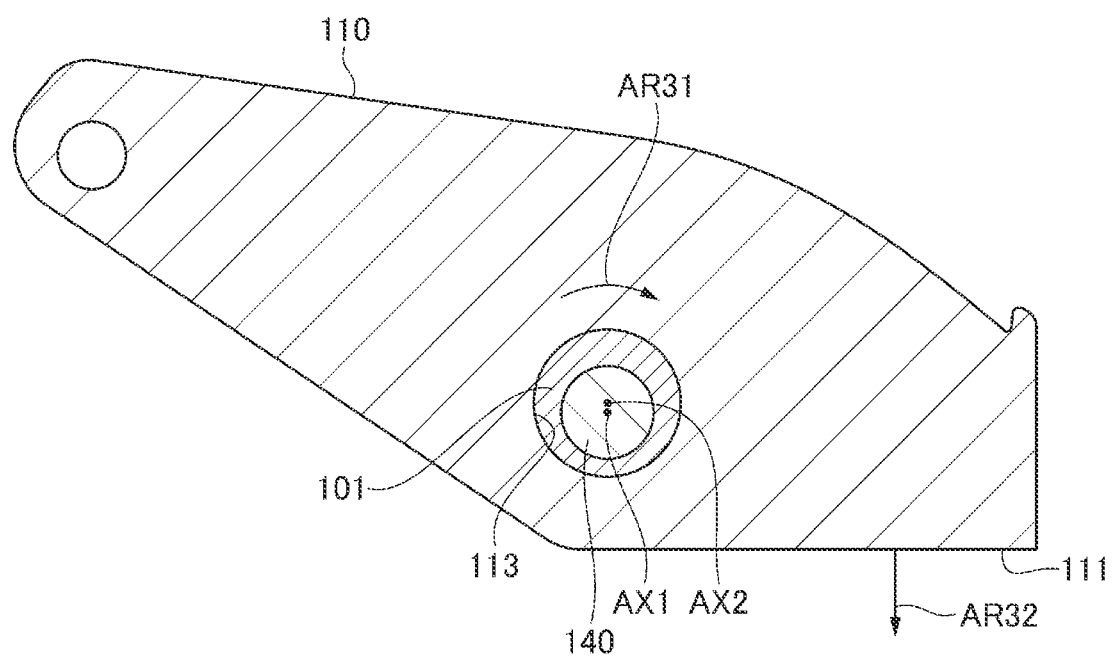
FIG. 11 is a diagram showing a configuration of the adjustment mechanism of the cutting device according to the fifth illustrative embodiment.

As shown in FIG. 11, also in the present illustrative embodiment, the shaft 101 is inserted into the through hole 113 of the blade member 110. As the blade member 110 rotates about the shaft 101, the cutting blade 111 opens and closes. A rotation central axis of the blade member 110 coincides with the central axis AX2 of the shaft 101.

A position of the central axis AX2 with respect to the housing 11 can be adjusted by, for example, gripping an enlarged diameter portion 141 and rotating the internal shaft 140 by the manufacturer or user of the cutting device 10. For example, when the internal shaft 140 is rotated in a direction of an arrow AR31 in FIG. 11, as a position of the central axis AX2 changes, the entire blade member 110 including the cutting blade 111 moves in a direction of an arrow AR32 with respect to the housing 11.

In the present illustrative embodiment, as described above, by changing a rotation angle of the internal shaft 140, the position of the central axis AX2 of the shaft 101, which is the rotation shaft, is changed, and accordingly, the gap between the cutting blades 111 when the cutting blades 111 come closest to each other can be adjusted. The shaft 101, the internal shaft 140, and the through hole 113 correspond to the "adjustment mechanism" for adjusting the gap between the pair of cutting blades 111.

A sixth illustrative embodiment will be described. In the following, points different from other illustrative embodiments will be mainly described, and descriptions of points common to those of the other illustrative embodiments will be omitted as appropriate (which will also be applied for other illustrative embodiments). This illustrative embodiment differs from other illustrative embodiments in a connection structure of the nut, connection member, and link member. In particular, it discloses a configuration in which the end face of the nut and a part of the connection member are brought into contact, thereby providing a structure that is less likely to be damaged under high load.

Figure 12:
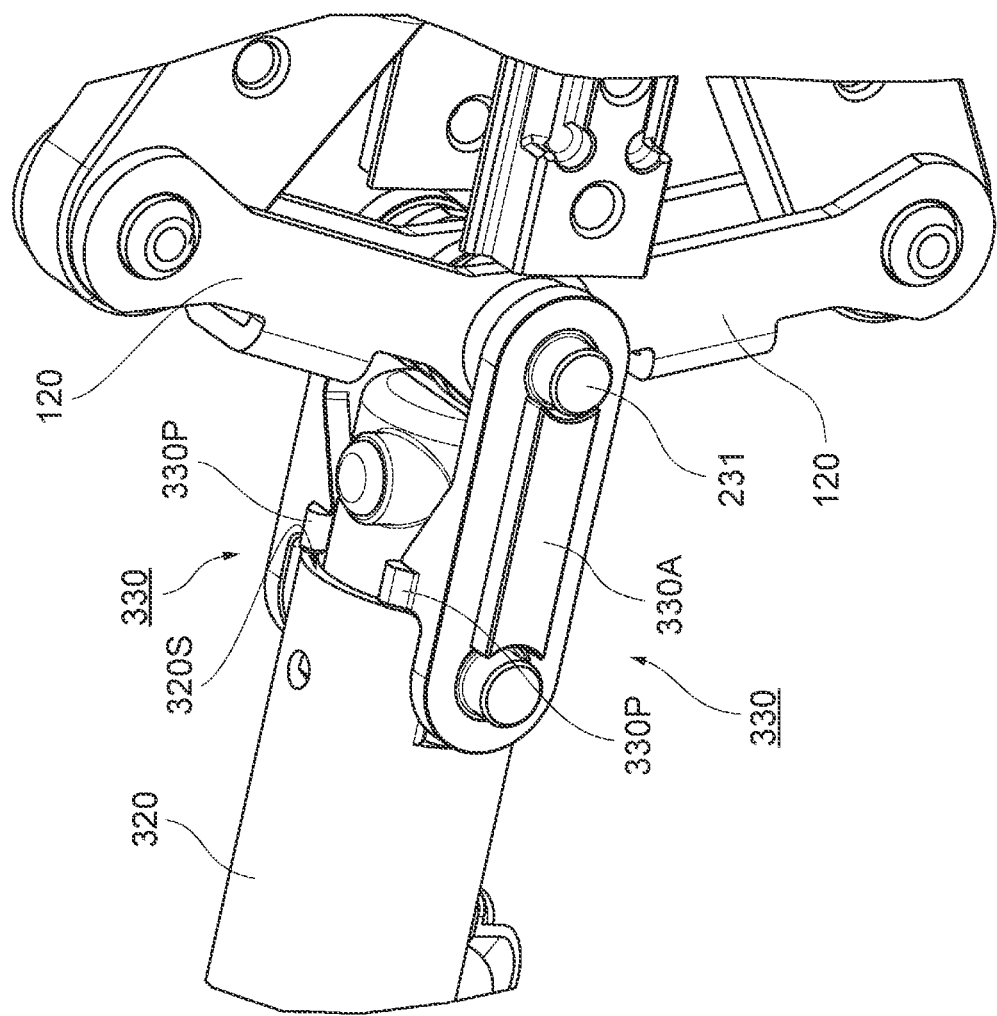
FIG. 12 is a diagram showing a configuration of a connection mechanism of the cutting device according to a sixth illustrative embodiment.

FIG. 12 is a partially enlarged perspective view showing a connection structure of the nut 320, connection member 330, and link member 120 in this illustrative embodiment. As the link member 120 has the same configuration as other illustrative embodiments, the same reference numerals are denoted and redundant descriptions will be omitted.

The nut 320 is a substantially cylindrical member disposed to surround the screw shaft 210 from an outer periphery side. A female screw is formed on an inner peripheral surface of the nut 320 and is screwed to a male screw formed on the outer peripheral surface of the screw shaft 210. When the screw shaft 210 rotates about the central axis thereof, the nut 320 moves along the central axis, which is the same as the nut 220.

The connection member 330 is a member that connects the nut 320 and the link member 120. The connection member 330 is formed by protruding inwardly (toward the central axis of the screw shaft 210) as shown in FIG. 12 and has a supported portion 330P supported by an end face 320S facing the front end side of the nut 320. The supported portion 330P is a portion that receives a reaction force from the end face 320S of the nut 320 when a force in the direction of the rear end is applied.

In addition to the supported portion 330P, the connection member 330 according to the present illustrative embodiment further includes a pair of arm portions 330A extending in the longitudinal direction of the screw shaft 210. In a region of the front side of the arm portion 330A, a link engagement hole for engaging with an end of the shaft 231 is formed. In a region of the rear end side of the arm portion 330A, a nut engagement hole for engaging with a protrusion protruding from the side surface of the nut 320 is formed.

As shown in FIG. 12, the connection member 330 and the link member 120 are connected by the end of the shaft 231 penetrating the link engagement hole, and the connection member 330 and the nut 320 are connected by the protrusion of the nut 320 penetrating the nut engagement hole. It is possible to restrict the rotation and movement of the connection member 330 around the axis. At this time, the supported portion 330P is supported by the end face 320S facing the front end side of the nut 320.

With this configuration, even when a strong load in a rearward direction is applied to the connection member 330 from the link member 120 during cutting of the object to be cut, a part of the load is received as compressive force by the end face 320S facing the front end side of the nut 320, rather than shear force. Therefore, it is possible to prevent the nut 320 from being enlarged to ensure its strength, and it is possible to reduce a size of the tool by reducing the outer diameter of the product including the nut 320 and the connection member 330. Accordingly, it makes possible to properly set the size of the grip part of the tool and improve the ease of operation of the tool.

In contrast, in a case of a comparative configuration where the supported portion 330P is not provided, all the loads acting on the connection member must be supported by the protrusion protruding from the side surface of the nut, so there is a high possibility that a large shear force is applied to the protrusion of the nut and the nut is damaged.

As shown in FIG. 12, another connection member 330 with the same configuration may also be provided on the opposite side of the screw shaft 210. As shown in FIG. 12, it may also be possible to curve both end portions of the supported portion 330P along the end face 320S. When the load is applied to the end face 320S of the nut 320, it is preferable to configure the load transmitted from the link member 120 to the connection member 330 at a position that is the same in the axial direction with respect to the contact surface between the supported portion 330P and the end face 320S of the nut 320. In other words, it is preferable to join the link member 120 and the connection member 330 on the inner side of the outer diameter of the nut 320. This makes it possible to reduce size (reduce in outer diameter) of the connection member 330 and the nut 320.

A seventh illustrative embodiment will be described. In this illustrative embodiment, a connection structure of the nut, connection member, and link member is different from other illustrative embodiments. However, it is common to the sixth illustrative embodiment in that the seventh illustrative embodiment adopts a configuration in which the end face of the nut and a part of the connection member are brought into contact so as to achieve a configuration that is less likely to be damaged under high load.

Figure 13:
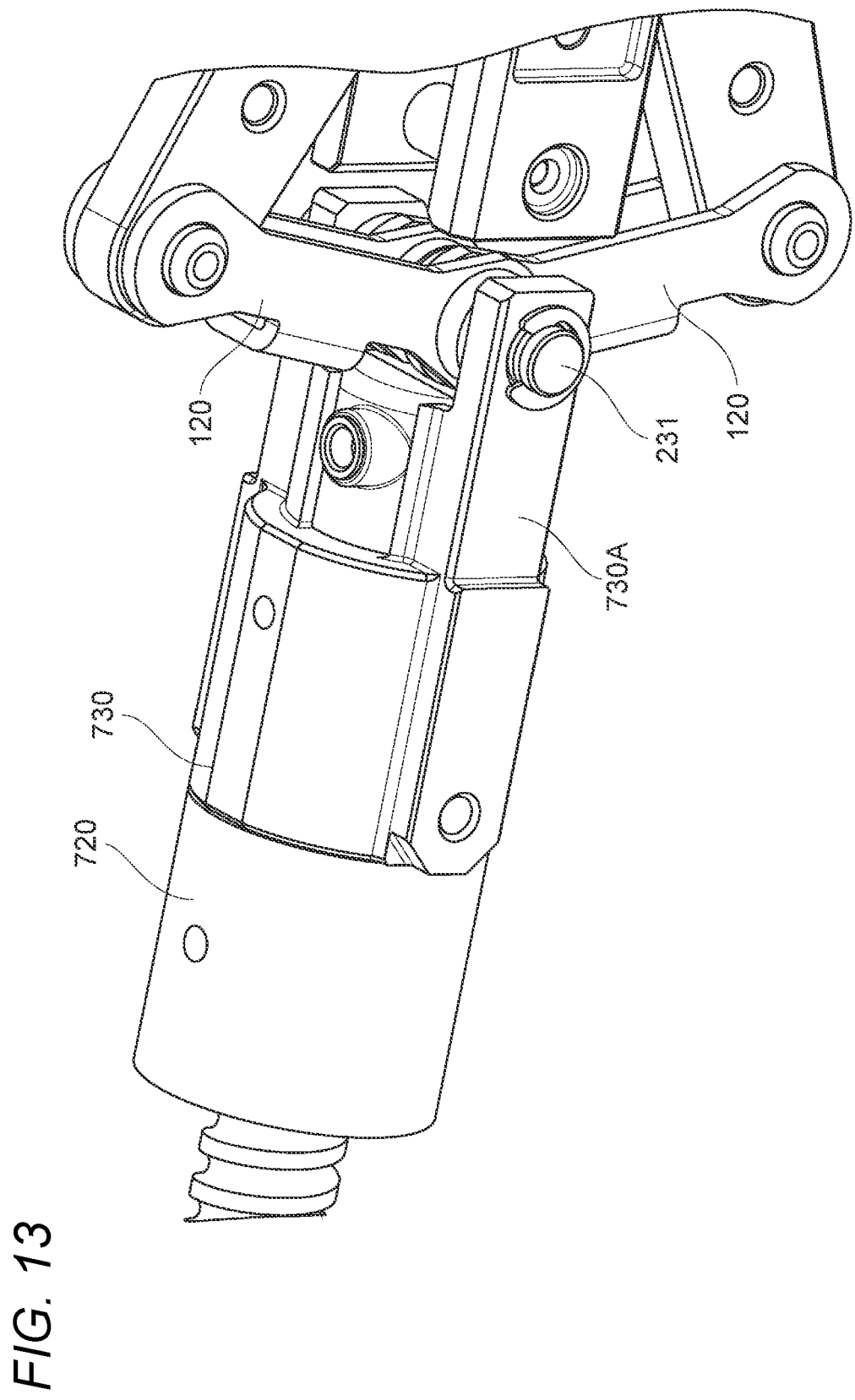
FIG. 13 is a diagram showing a configuration of a connection mechanism of the cutting device according to a seventh illustrative embodiment.

FIG. 13 is a partially enlarged perspective view showing a connection structure of the nut 720, connection member 730, and link member 120 in this illustrative embodiment.

The nut 720 is a substantially cylindrical member disposed to surround the screw shaft 210 from an outer periphery side. A female screw is formed on an inner peripheral surface of the nut 720 and is screwed to a male screw formed on the outer peripheral surface of the screw shaft 210. When the screw shaft 210 rotates about the central axis thereof, the nut 720 moves along the central axis, which is the same as the nut 320. Furthermore, in a region of the front end side of the nut 720, a front end portion having a smaller diameter than a rear end region is formed. A male screw is formed on the front end portion. In other words, the nut 720 has a rear end portion having a relatively large diameter and the front end portion having a relatively small diameter with a female screw formed on the outer peripheral surface.

The connection member 730 is a member that connects the nut 720 and the link member 120. The connection member 730 may be referred to as a trunnion as being formed in a cylindrical shape. A female screw is formed on an inner peripheral surface of the connection member 730 and is screwed to a male screw formed on the outer peripheral surface of the front end portion of the nut 720, thereby connecting the nut 720 and the connection member 730. The connection member 730 is supported by a step surface between the rear end portion and the front end portion of the nut 720. This step surface corresponds to an end face facing the front end side of the nut 720.

The connection member 730 of this illustrative embodiment further includes a pair of arm portions 730A extending in the longitudinal direction of the screw shaft 210. A link engagement hole for engaging with the end of the shaft 231 is formed in the region of the front end side of the arm portion 730A.

As shown in FIG. 13, the connection member 730 and the link member 120 are connected by the end of the shaft 231 penetrating the link engagement hole. In this case, the surface of the connection member 730 facing the rear end side is supported by the end face facing the front end side of the nut 720.

With this configuration, even when a strong load in the rearward direction is applied to the connection member 730 from the link member 120 during cutting of the object to be cut, a part of the load is received as compressive force by the end face facing the front end side of the nut 720, rather than shear force. Therefore, it is possible to provide a configuration that is less likely to be damaged under high load.

Figure 14:
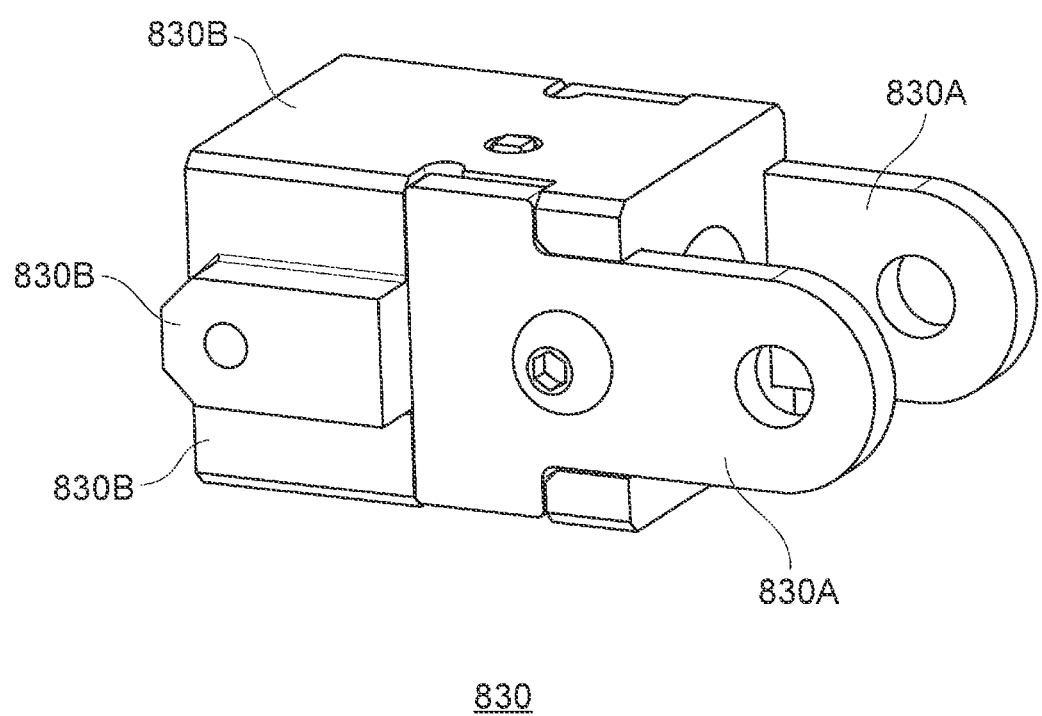
FIG. 14 is a diagram showing a configuration of a connection mechanism of the cutting device according to an eighth illustrative embodiment.

An Eighth illustrative embodiment will be described. In this illustrative embodiment, the connection member, which may also be referred to as a trunnion, is configured by two different materials. FIG. 14 is a perspective view showing the connection member 830 according to this illustrative embodiment.

The connection member 830 includes a first portion (nut connecting portion 830B) that connects to the nut and a second portion (link connecting portion 830A) that connects to the link member 120. A female screw is formed on an inner peripheral surface of the nut connecting portion 830B and is screwed to a male screw formed on the outer peripheral surface of the front end portion of the nut 720. The nut connecting portion 830B is supported by a step surface between a rear end portion and a front end portion of the nut 720. The nut connecting portion 830B is made of a lighter material (lower specific gravity) and lower strength material than the second portion. The nut connecting portion 830B is formed from aluminum, for example.

On the other hand, the link connecting portion 830A includes a pair of arm portions for connecting to the shaft 231. The link connecting portion 830A is made of a heavier material (higher specific gravity) and higher strength material than the nut connecting portion 830B. The link connecting portion is formed from steel, for example. The area of the region supported by the nut connecting portion 830B may be increased by forming the link connecting portion 830A with a longer region in the vertical direction.

Furthermore, the nut connecting portion 830B has dimensional constraints due to the need to penetrate the screw shaft 210 inwardly, making it difficult to downsize. Therefore, if the link connecting portion 830A and the nut connecting portion 830B are integrally formed with the same material, the connection member 830 becomes a heavy component with excessive strength for the required specifications. In this regard, in this illustrative embodiment, by reducing the weight of the nut connecting portion 830B, it is possible to achieve the overall weight reduction of the connection member 830. Therefore, it is possible to reduce inertia of the connection member 830. Therefore, it is possible to improve accuracy in a stop position control and to enable quick operation of the screw shaft 210 of the nut 720 and the connection member 830. On the other hand, the link connecting portion 830A, which is subjected to high loads by being connected to the toggle link, can ensure strength by using a high-strength material. Further, by increasing the area where the nut connecting portion 830B supports the link connection section 830A, the load can be effectively distributed. Accordingly, it is possible to achieve both weight reduction and strength assurance.

The present illustrative embodiment has been described above with reference to specific examples. However, the present disclosure is not limited to these specific examples. Design changes made by those skilled in the art as appropriate to these specific examples are also included within the scope of the present disclosure as long as the changes have characteristics of the present disclosure. Elements included in each of the specific examples described above, and arrangement, conditions, shapes, and the like of the elements are not limited to those illustrated, and can be changed as appropriate. The elements included in each of the specific examples described above can be appropriately combined as long as no technical contradiction occurs.

What is claimed is:

1. An electric cutting device, comprising:
   a pair of cutting blades configured to clamp and cut an object;
   an electric motor configured to generate a driving force; and
   a drive mechanism configured to cause the cutting blades to operate by the driving force of the electric motor,
   wherein the drive mechanism comprises a movement member configured to move in a predetermined direction by the driving force of the electric motor, the drive mechanism being configured to convert movement of the movement member into an opening and closing operation of the cutting blades, and
   wherein the drive mechanism is configured to:
   in a case where the movement member moves in the predetermined direction, cause the pair of cutting blades to move in a direction closer to each other; and
   after the pair of cutting blades come closest to each other, in a case where the movement member further moves in the predetermined direction, cause the pair of cutting blades to move in a direction away from each other.

2. The cutting device according to claim 1, further comprising:
   a controller configured to control an operation of the electric motor,
   wherein in a case of cutting the object, the controller is configured to:
   cause the movement member to move in the predetermined direction until the pair of cutting blades begin moving away from each other, following the pair of cutting blades moving closer to each other and coming closest to each other.

3. The cutting device according to claim 1, wherein the drive mechanism further comprises:
   a rod-shaped link member that connects the cutting blades and the movement member, and is configured such that when the pair of cutting blades come closest to each other, an angle formed between a longitudinal direction of the link member and the predetermined direction is set to 90 degrees.

4. The cutting device according to claim 1,
   wherein the pair of cutting blades includes a first cutting blade and a second cutting blade,
   wherein the cutting device further comprises:
   a first blade member having the first cutting blade; and
   a second blade member having the second cutting blade, wherein the drive mechanism further comprises:
   a first link member that connects the first blade member and the movement member; and
   a second link member that connects the second blade member and the movement member,
   wherein the first link member and the first blade member are pivotally connected to each other at a first connection point, the first connection point being located across a rotation shaft of the first blade member from the first cutting blade, and
   wherein the second link member and the second blade member are pivotally connected to each other at a second connection point, the second connection point being located across a rotation shaft of the second blade member from the second cutting blade.

5. The cutting device according to claim 4, wherein a distance between the first connection point and the second connection point in a direction perpendicular to the predetermined direction is:
   a first distance when the pair of cutting blades come closest to each other; and
   a second distance when the pair of cutting blades begin moving away from each other, following the pair of cutting blades coming closest to each other, the second distance being shorter than the first distance.

6. The cutting device according to claim 4,
   wherein the first link member, the second link member and the movement member are connected to one another in a manner of pivoting about a shaft of the movement member, and wherein when the pair of cutting blades come closest to each other, the first link member and the second link member align in a substantially straight line as viewed from an axial direction of the shaft of the movement member.

7. The cutting device according to claim 1, wherein a gap is formed between the pair of cutting blades when the pair of cutting blades come closest to each other.

\* \* \* \* \*